United States Patent
Kamada et al.

(10) Patent No.: US 7,553,253 B2
(45) Date of Patent: Jun. 30, 2009

(54) AUTOMATIC TRANSMISSION

(75) Inventors: Shinya Kamada, Hiroshima (JP);
Junichi Doi, Hiroshima (JP); Takamichi Teraoka, Hiroshima (JP); Tokimori Saka, Hiroshima (JP); Tatsutoshi Mizobe, Hiroshima (JP); Naohiro Sakaue, Hiroshima (JP); Yoshihiko Fujita, Hiroshima (JP); Norio Iwashita, Hiroshima (JP); Satoshi Komori, Hiroshima (JP); Kazuhiko Ueda, Hiroshima (JP); Seiji Esaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 243 days.

(21) Appl. No.: 11/513,081

(22) Filed: Aug. 31, 2006

(65) Prior Publication Data

US 2007/0060439 A1   Mar. 15, 2007

(30) Foreign Application Priority Data

Sep. 12, 2005   (JP)   ............................. 2005-263965

(51) Int. Cl.
*F16H 3/62*   (2006.01)
(52) U.S. Cl. .................. 475/284; 475/276; 475/285
(58) Field of Classification Search ................. 475/269, 475/271, 275, 276, 282, 284, 285, 311, 317, 475/323
See application file for complete search history.

(56) References Cited

U.S. PATENT DOCUMENTS

| 4,683,776 A | * | 8/1987 | Klemen ..................... 475/286 |
| 5,106,352 A |   | 4/1992 | Lepelletier |
| 6,746,357 B1 | * | 6/2004 | Usoro et al. ................ 475/275 |
| 6,884,197 B2 |   | 4/2005 | Ishimaru et al. |
| 6,905,434 B2 |   | 6/2005 | Sugihara et al. |

FOREIGN PATENT DOCUMENTS

DE   101 62 888   7/2003

(Continued)

OTHER PUBLICATIONS

Extended European Search Report, mailed Aug. 17, 2007 and issued in corresponding European Patent Application No. 06018467.8-1254.

*Primary Examiner*—Charles A Marmor
*Assistant Examiner*—Edwin A Young

(57) ABSTRACT

In an automatic transmission (AT) in which an input shaft (Input) and an output gear (Output) are disposed on the same axis and three clutches (C1-C3) and two brakes (B1, B2) are selectively operated to provide six forward speeds, first and second planetary gear sets (GS1, GS2) are configured to consistently reduce the speed of input rotation and output the speed-reduced rotation, thereby enabling downsizing of them. The first and second planetary gear sets (GS1, GS2) are arranged in a transmission case at both the axial ends thereof. Third and fourth planetary gear sets (GS3, GS4) are connected to each other to have four rotation elements in combination, thereby constituting a Simpson planetary gear train. One of the four rotation elements (a fourth carrier (PC4) in an illustrated example) is connected to the output gear (Output). Rotations input and reduced in speed by the first and second planetary gear sets (GS1, GS2) are input to sun gears (S3, S4) of the third and fourth planetary gear sets (GS3, GS4), respectively. First to third clutches (C1-C3) and a first brake (B1) are arranged to surround the first and second planetary gear sets (GS1, GS2).

7 Claims, 2 Drawing Sheets

FOREIGN PATENT DOCUMENTS

| | | |
|---|---|---|
| EP | 0 719 961 | 7/1996 |
| EP | 1 566 574 | 8/2005 |
| JP | 04-219553 | 8/1992 |
| JP | 2004-69050 | 3/2004 |
| WO | WO 02/099316 A1 | 12/2002 |

* cited by examiner

FIG. 2

|  | 1 | 2 | 3 | 4 | 5 | 6 | R |
|---|---|---|---|---|---|---|---|
| Low/C (C3) | ● | ● | ● | ● |  |  |  |
| High/C (C2) |  |  |  | ● | ● | ● |  |
| 3/5/RC (C1) |  |  | ● |  | ● |  | ● |
| L/R Br. (B2) | ● |  |  |  |  |  | ● |
| 2/6 Br. (B1) |  | ● |  |  |  | ● |  |

Page 1, Column 1:

AUTOMATIC TRANSMISSION

BACKGROUND OF THE INVENTION (a) Field of the Invention

This invention relates to automatic transmissions that provide six forward speeds by means of three clutches and two brakes.

(b) Description of the Related Art

As an automatic transmission of this type, there is conventionally known one that includes an input shaft, a speed reducing gear set for reducing the rotation speed of the input shaft, a Simpson planetary gear train formed by combining two simple planetary gear sets, three clutches, two brakes and an output shaft and is configured to appropriately selectively engage and release the three clutches and two brakes serving as friction elements (see, for example, FIG. 1 in Unexamined Japanese Patent Publication No. H04-219553 (hereinafter, referred to as Patent Document 1)).

In the above automatic transmission, in order to provide an overdrive gear, inputs to a carrier and an associated ring gear of the planetary gear train are necessary. If, however, the input shaft and the output shaft are arranged on the same axis, it is impossible to establish the input path connecting to both the carrier and the ring gear of each simple planetary gear set having only three rotation elements. Therefore, in the above automatic transmission, no alternative exists but to arrange the input and output shafts in parallel on different axes, which leads to upsizing the transmission.

On the other hand, for example, FIGS. 3 and 13 in the same document discloses a technique using, instead of the Simpson planetary gear train, a so-called Ravigneaux planetary gear train (a compound planetary gear train of double pinion type in which two sun gears are meshed with each pair of inner and outer pinions, respectively). Further, in this technique, in order to arrange the input and output shafts on the same axis, a single pinion type planetary gear set is used as a speed reducing gear set for reducing the speed of input rotation.

However, generally, the Ravigneaux planetary gear train has a problem that its gear noise and vibrations are likely to become large because of its complex structure and a large number of meshing gears. Further, the Ravigneaux planetary gear train has various problems of higher cost than the Simpson planetary gear train, difficulty in ensuring its strength and production of torque circulation inside the planetary gear train.

In view of the above points, as disclosed in, for example, the pamphlet of International Patent Publication No. WO02/099316 (hereinafter, referred to as Patent Document 2) and Unexamined Japanese Patent Publication No. 2004-069050 (hereinafter, referred to as Patent Document 3), there is proposed a technique in which a Simpson planetary gear train, not a Ravigneaux planetary gear train, is employed and one of two planetary gear sets forming the gear train is composed of a so-called double ring gear type or double sun gear type planetary gear set to allow its center member to radially input and output the rotation into and out of the carrier.

—Problems that the Invention is to Solved —

The double ring gear type or double sun gear type planetary gear set as in the proposed technique, however, cannot be obtained by simply separating a ring gear or a sun gear in halves but must be configured so that individual separated ring or sun gears have sufficient strength in consideration of their power transmission.

Therefore, the above planetary gear set such as a double ring gear type planetary gear set has a profile of approximately the same size as a combination of two planetary gear sets, which is a substantially large in the direction of the rotation axis. Further, the pinion bridged over and meshed with the separated ring or sun gears is long and, therefore, is likely to tilt during rotation. Hence, the above planetary gear set tends to produce large gear noise and vibrations, not as large as the Ravigneaux planetary gear train.

The present invention has been made in view of the foregoing points and, therefore, its object is to make compact a six-speed automatic transmission of a type as proposed above while restraining production of gear noise.

SUMMARY OF THE INVENTION

To attain the above object, in the present invention, a double ring gear type or double sun gear type planetary gear set is intentionally replaced with two planetary gear sets and one of the planetary gear sets added for this purpose is used as a consistently speed reducing gear set having a small transmission torque, thereby making the transmission compact.

Specifically, a first solution of the present invention is directed to an automatic transmission in which an input shaft and an output part are disposed on the same axis, first to fourth planetary gear sets each formed of a sun gear, a carrier and a ring gear are provided and first to third clutches and first and second brakes are selectively operated to switch between power transmission paths from the input shaft to the output part, thereby providing at least six forward speeds.

In the above automatic transmission, each of the first and second planetary gear sets includes a given rotation element connected to the input shaft to consistently reduce the speed of input rotation and output the speed-reduced rotation, and a single pinion planetary gear set is used as each of the third and fourth planetary gear sets. The third and fourth planetary gear sets are connected to each other to have four rotation elements in combination and one of the four rotation elements is connected to the output part. Further, the first and second planetary gear sets are arranged oppositely in the axial direction of the third and fourth planetary gear sets with the third and fourth planetary gear sets interposed therebetween.

The automatic transmission of the above structure, like the related arts (Patent Documents 2 and 3), includes one planetary gear set for consistently reducing the speed of input rotation and a Simpson planetary gear train assembled with the one planetary gear set and composed itself of two planetary gear sets and provides six forward speeds by selectively operating three clutches and two brakes. However, unlike the related arts, the automatic transmission further includes an additional planetary gear set. This eliminates the need to use a double ring gear type or double sun gear type planetary gear set as used in the related arts and, therefore, eliminates the possibility of increasing gear noise and vibrations.

Further, since the additional planetary gear set is for consistently reducing the speed of input rotation, it can be well downsized by minimizing the torque load. If the consistently speed reducing planetary gear set thus downsized and the other downsized speed reducing planetary gear set are arranged oppositely on both the axial sides of the Simpson planetary gear train, multi-plate clutches, for example, can be arranged to surround the downsized planetary gear sets, which is advantageous in compaction of the transmission.

In the above structure, if the first and second planetary gear sets are single pinion planetary gear sets and the sun gears of the first and second planetary gear sets are fixed to a transmission case (a second solution of the invention), this is preferable because it provides a simplified structure. Further, if the sun gears of the first and second planetary gear sets are fixed to bosses, respectively, formed at both axial ends of the transmission case (third and sixth solutions of the invention), this improves assemblability.

The first and second planetary gear sets preferably have different rotational speed reduction ratios (fourth and seventh solutions of the invention). The reason for this is that rotations transmitted from the input shaft to the first and second planetary gear sets are input to the Simpson planetary gear train at different speed reduction ratios, respectively, and, therefore, the flexibility in setting the gear ratio in each of gear positions for the six forward speeds is increased.

In a preferred structure of the automatic transmission, the first planetary gear set is a single pinion planetary gear set including a first sun gear, a first carrier and a first ring gear, the second planetary gear set is a single pinion planetary gear set including a second sun gear, a second carrier and a second ring gear, the first and second sun gears are constantly secured to a transmission case and the first and second ring gears are constantly connected to the input shaft.

Likewise, the third planetary gear set is a single pinion planetary gear set including a third sun gear, a third carrier and a third ring gear, the fourth planetary gear set is a single pinion planetary gear set including a fourth sun gear, a fourth carrier and a fourth ring gear, the third ring gear, the fourth carrier and the output part are constantly connected and the third carrier and the fourth ring gear are constantly connected.

Further, the automatic transmission includes: a first clutch for making and breaking connection between the first carrier and the third sun gear; a first brake for making and breaking connection between the third sun gear and the transmission case; a second brake for making and breaking connection between the third carrier and the transmission case; a second clutch for making and breaking connection between the third carrier and the second ring gear; and a third clutch for making and breaking connection between the fourth sun gear and the second carrier.

Furthermore, the automatic transmission is configured to provide a first speed through engagement of the third clutch and the second brake, a second speed through engagement of the third clutch and the first brake, a third speed through engagement of the first clutch and the third clutch, a fourth speed through engagement of the third clutch and the second clutch, a fifth speed through engagement of the first clutch and the second clutch and a sixth speed through engagement of the second clutch and the first brake (a fifth solution of the invention).

According to the above structure, the number of meshing gears in each of the first to sixth gear positions becomes relatively small, which provides high transmission efficiency. Further, since the number of clutches and brakes engaged and the number of clutches and brakes released in changing from one gear position to the adjacent are both singular, this provides high controllability.

As described so far, in the automatic transmission of the present invention, in order to provide six forward speeds by means of three clutches and two brakes, first and second planetary gear sets are provided in addition to third and fourth planetary gear sets forming a Simpson planetary gear train, configured as consistently speed reducing gear sets capable of downsizing and arranged oppositely on both the axial sides of the planetary gear train. This provides high gear positions including an overdrive gear even with the input shaft and the output part disposed on the same axis, eliminates the possibility of increasing gear noise and vibration and is advantageous in compaction of the transmission.

In particular, according to the third and sixth solutions of the invention, since the small-sized planetary gear sets are arranged on both the axial ends of the transmission case and their sun gears are fixed to the bosses formed at the case ends, this simplifies the transmission structure and improves assemblability.

According to the fourth and seventh solutions of the invention, since the two planetary gear sets for consistently reducing the speed of input rotation have different speed reduction ratios as described above, this increases the flexibility in setting the gear ratio in each gear position as compared to the case where they have the same speed reduction ratio.

BRIEF DESCRIPTION OF THE DRAWINGS

FIG. 2 is an operation table for the automatic transmission.

DETAILED DESCRIPTION OF THE INVENTION

Figure 1:
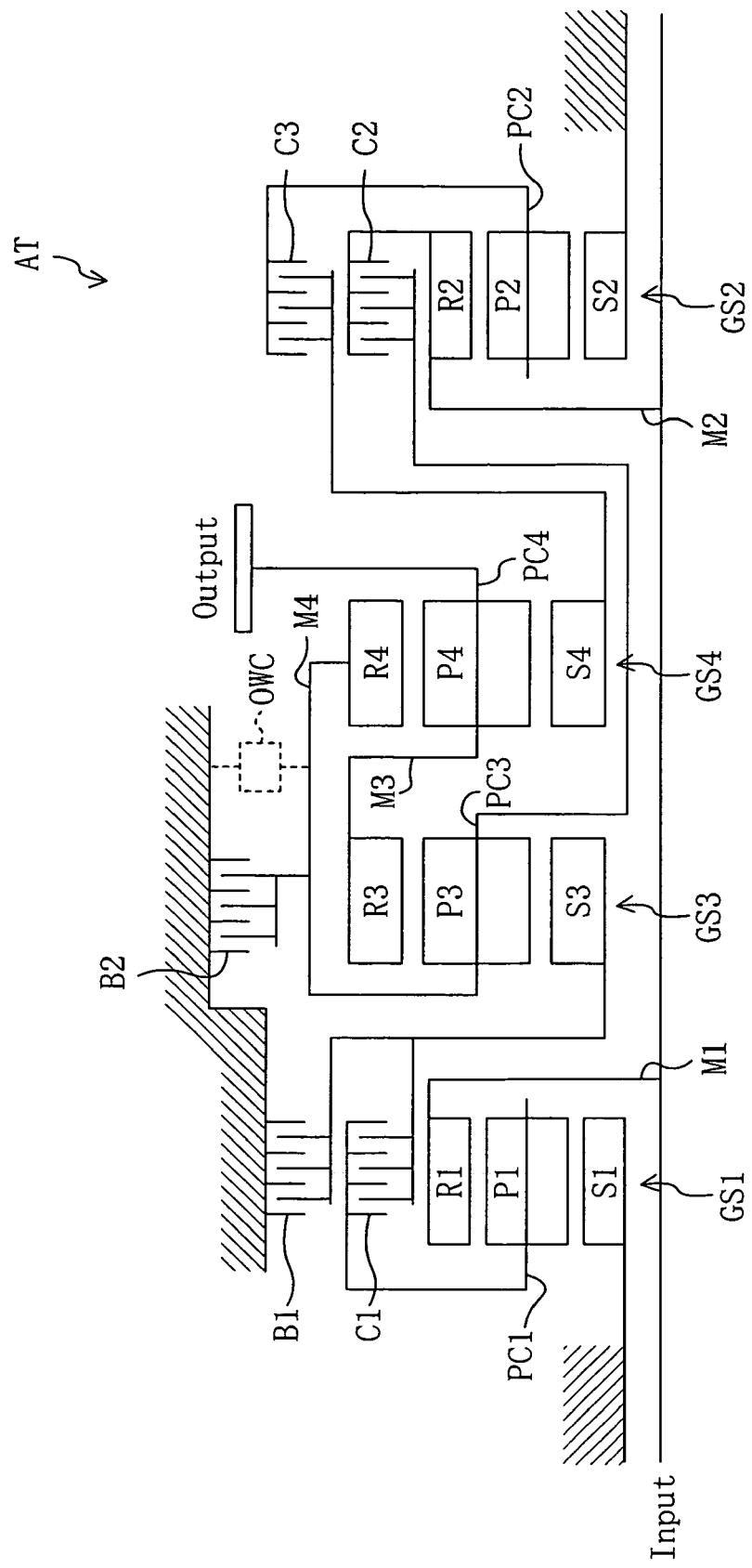
FIG. 1 is a skeleton diagram showing a schematic structure of an automatic transmission according to an embodiment of the present invention.

An embodiment of the present invention will be described below in detail with reference to the drawings. The following preferred embodiment is merely illustrative in nature and not intended to limit the scope, applications and use of the invention.

FIG. 1 is a skeleton diagram showing the structure of a transmission gear mechanism in the case where an automatic transmission AT according to an embodiment of the present invention is applied to, as an example, a transversely mounted power train for a front engine-front drive car (FF car). In the figure, "Input" indicates an input shaft for inputting driving torque through a torque converter (not shown) from an engine serving as a driving source located outside the figure and "Output" indicates an output gear (output part) for outputting the driving torque through a final gear or the like towards drive wheels. The input shaft Input and the output gear Output are disposed on the same axis.

In FIG. 1, reference characteristics GS1 to GS4 denotes first to fourth planetary gear sets, respectively, each including a sun gear, a carrier and a ring gear as rotation elements. The first and second planetary gear sets GS1 and GS2 have a smaller size than the third and fourth planetary gear sets GS3 and GS4 and are arranged oppositely in the axial direction of the third and fourth planetary gear sets GS3 and GS4 with the third and fourth planetary gear sets GS3 and GS4 interposed therebetween.

The first planetary gear set GS1 is a single pinion planetary gear set including a first sun gear S1, a first ring gear R1 and a first carrier PC1 for supporting a first pinion P1 meshing with both the gears S1 and R1. The second planetary gear set GS2 is a single pinion planetary gear set including a second sun gear S2, a second ring gear R2 and a second carrier PC2 for supporting a second pinion P2 meshing with both the gears S2 and R2.

Though not shown in the figure, the first and second sun gears S1 and S2 are fixed (constantly secured) by a spline or any means to axially adjacent walls of the transmission case or bosses of the walls for supporting the input shaft Input. On the other hand, the first and second ring gears R1 and R2 are connected (constantly connected) to the input shaft Input via first and second connecting members M1 and M2, respectively. Thus, the rotation of the input shaft Input is consistently reduced in speed by each of the first and second planetary gear sets GS1 and GS2 and then output from the first and second carriers PC1 and PC2.

The small-sized, consistently speed reducing planetary gear sets GS1 and GS2 are arranged at both ends, respectively, of the automatic transmission in the direction of the input shaft Input (axial direction) and first to third clutches C1 to C3 formed of wet multi-plate clutches and a first brake B1 are disposed to surround the planetary gear sets GS1 and GS2. This is advantageous in compaction of the transmission AT. Alternatively, at the end of the transmission case opposite to the engine, no clutches and brakes may be disposed around the planetary gear sets GS1 and GS2 and that end of the transmission case may be reduced in diameter, which improves the mountability of the transmission AT to the car.

Further, since the sun gears S1 and S2 of the two planetary gear sets GS1 and GS2 arranged at the axial ends of the transmission case are fixed using axially adjacent walls and bosses, this provides simplified structures and improved assemblability.

Furthermore, the first and second planetary gear sets GS1 and GS2 are configured to have different input rotational speed reduction ratios (gear ratios of the associated ring gears to the associated pinions). This enhances the flexibility in setting the gear ratio in each of gear positions for the first to sixth forward speeds provided as described hereinafter. Specifically, as described later, the input rotational speed reduction ratio of the first planetary gear set GS1 is involved with gear positions for the first to fourth forward speeds, while the input rotational speed reduction ratio of the second planetary gear set GS2 is involved with gear positions for the third and fifth forward speeds. Therefore, for example, the gear ratio for the third speed can be changed with the gear ratios for the second and fourth speeds maintained (and, at this time, the gear ratio for the fifth speed is also changed).

The third planetary gear set GS3 is a single pinion planetary gear set including a third sun gear S3, a third ring gear R3 and a third carrier PC3 for supporting a third pinion P3 meshing with both the gears S3 and R3. The fourth planetary gear set GS4 is a single pinion planetary gear set including a fourth sun gear S4, a fourth ring gear R4 and a fourth carrier PC4 for supporting a fourth pinion P4 meshing with both the gears S4 and R4.

The third ring gear R3 and the fourth carrier PC4 are connected (constantly connected) for unitary rotation via a third connecting member M3 and the output gear Output is connected to the fourth carrier PC4 for unitary rotation. Further, the third carrier PC3 and the fourth ring gear R4 are connected (constantly connected) for unitary rotation via a fourth connecting member M4. Thus, the third and fourth planetary gear sets GS3 and GS4 are connected to each other to have four rotation elements in combination (the third sun gear S3, a combination of the third carrier PC3 and the fourth ring gear R4, a combination of the third ring gear R3 and the fourth carrier PC4, and the fourth sun gear S4), thereby constituting a Simpson planetary gear train.

The first to third clutches C1 to C3 and the first and second brakes B1 and B2 are selectively operated to switch between power transmission paths from the input shaft Input to the output gear Output, thereby providing six forward speeds and one reverse.

Specifically, first, the first clutch C1 is a clutch for selectively making and breaking the connection between the first carrier PC1 and the third sun gear S3. Further, the first clutch C1 is engaged in the third, fifth and reverse gear positions as shown in the operation table of FIG. 2 and, therefore, also called as a 3/5/R clutch (3/5/RC).

The second clutch C2 is a clutch for selectively making and breaking the connection between the third carrier PC3 and the second ring gear R2. Further, the second clutch C2 is engaged at higher speeds, i.e., in the fourth to sixth gear positions, and, therefore, also called as a high clutch (High/C). The third clutch C3 is a clutch for selectively making and breaking the connection between the fourth sun gear S4 and the second carrier PC2. Further, the third clutch C3 is engaged at lower speeds, i.e., in the first to fourth gear positions, and, therefore, also called as a low clutch (Low/C).

The first brake B1 is a brake for selectively making and breaking the connection between the third sun gear S3 and the transmission case to selectively stop the third sun gear S3. Further, the first brake B1 is engaged in the second and sixth gear positions and, therefore, also called as a 2/6 brake (2/6 Br.). The second brake B2 is a brake for selectively making and breaking the connection between the transmission case and the fourth connecting member M4 connecting the third carrier PC3 and the fourth ring gear R4 to selectively stop the fourth connecting member M4. Further, the second brake B2 is engaged in the first and reverse gear positions and, therefore, also called as a low/reverse brake (L/R Br.). As shown in broken lines in FIG. 1, a one-way clutch OWC may be disposed in parallel with the second brake B2.

The relation between the operating states of the clutches C1 to C3 and brakes B1 and B2 and gear positions will be summarized as in the operation table of FIG. 2. In the figure, filled circles indicate cases where the clutches or brakes are engaged. However, if the one-way clutch OWC is disposed in parallel with the second brake B2, the engagement of the second brake B2 is not needed in the first forward gear position. The engagement of the second brake B2 is needed only when an engine brake should be applied, such as in a manual mode or in a hold mode.

Though not shown in FIG. 1, the first to third clutches C1 to C3 and first and second brakes B1 and B2 are connected to a transmission oil pressure control unit. The transmission oil pressure control unit produces an engagement pressure (indicated by the solid circles) and a release pressure (indicated by blanks) in each gear position as shown in the operation table of FIG. 2. Such transmission oil pressure control units include hydraulic control type control units, electronic control type control units and electronic-hydraulic control type control units.

Operations of Automatic Transmission

Next, a description is given of operations of the automatic transmission AT of the present embodiment in individual gear positions.

—First Forward Gear Position—

As shown in FIG. 2, the first forward speed is provided through the engagement of the third clutch C3 and the second brake B2. In this case, first, the engagement of the third clutch C3 causes the connection between the second carrier PC2 and the fourth sun gear S4. Thus, the rotation input from the input shaft Input to the second ring gear R2 of the second planetary gear set GS2 is reduced in speed, output from the second carrier PC2 and then input to the fourth sun gear S4 of the fourth planetary gear set GS4. Further, in the fourth planetary gear set GS4, the engagement of the second brake B2 stops the rotation of the fourth ring gear R4. Therefore, the rotation input to the fourth sun gear S4 is reduced in speed and then output from the fourth carrier PC4.

In the above manner, in the first forward gear position, the input rotation consistently reduced in speed by the second planetary gear set GS2 is further reduced in speed according to the gear ratio between the fourth ring gear R4 and the fourth pinion P4 of the fourth planetary gear set GS4 and then output to the output gear Output.

— Second Forward Gear Position —

In the second forward gear position, as shown in FIG. 2, the second brake B2 engaged in the first forward gear position is released and the first brake B1 is engaged. In other words, the second forward speed is provided through the engagement of the third clutch C3 and the first brake B1. In this case, the engagement of the first brake B1 stops the rotation of the third sun gear S3 in the third planetary gear set GS3 and, as in the first forward gear position, the engagement of the third clutch C3 causes the reduced rotation from the second planetary gear set GS2 to be input to the fourth sun gear S4 of the fourth planetary gear set GS4.

When the fourth sun gear S4 is thus rotated, the fourth carrier PC4 is rotated at reduced speed as in the first forward gear position and, in turn, the third ring gear R3 of the third planetary gear set GS3 also rotates unitarily with the fourth carrier PC4. Since in the third planetary gear set GS3 the third sun gear S3 is stopped to rotate, the third carrier PC3 also rotates in the same direction.

Thus, the fourth ring gear R4 of the fourth planetary gear set GS4 constantly connected to the third carrier PC3 also rotates and the rotation of the fourth ring gear R4 is added to the reduced rotation transmitted from the fourth sun gear S4 to the fourth carrier PC4 to speed up the rotation of the fourth carrier PC4. Therefore, in the second forward gear position, the input rotation from the input shaft Input is output as a reduced rotation of higher speed than the first forward speed to the output gear Output.

— Third Forward Gear Position —

In the third forward gear position, as shown in FIG. 2, the first brake B1 engaged in the second forward gear position is released and the first clutch C1 is engaged. In other words, the third forward speed is provided through the engagement of the first clutch C1 and the third clutch C3. In this case, first, as in the first and second forward gear positions, the engagement of the third clutch C3 causes the reduced rotation from the second planetary gear set GS2 to be input to the fourth sun gear S4 of the fourth planetary gear set GS4.

On the other hand, the engagement of the first clutch C1 causes the connection between the first carrier PC1 and the third sun gear S3. Thus, the rotation input from the input shaft Input to the first ring gear R1 is reduced in speed and then input from the first carrier PC1 to the third sun gear S3 of the third planetary gear set GS3. Then, in the third and fourth planetary gear sets GS3 and GS4 forming a Simpson planetary gear train, the reduced rotation input to the third sun gear S3 is combined with the reduced rotation input to the fourth sun gear S4 and the combined rotation is then output via the fourth carrier PC4 to the output gear Output.

In the third forward gear position, the third sun gear S3 stopped in the second forward gear position rotates in the same direction as the third carrier PC3 and the rotation of the third sun gear S3 is added to the rotation of the third carrier PC3 to speed up the rotation of the fourth ring gear R4 rotating unitarily with the third carrier PC3 as compared to that in the second forward gear position. Therefore, in the third forward gear position, the input rotation from the input shaft Input is output as a reduced rotation of higher speed than the second forward speed to the output gear Output.

— Fourth Forward Gear Position —

In the fourth forward gear position, as shown in FIG. 2, the first clutch C1 engaged in the third forward gear position is released and the second clutch C2 is engaged. In other words, the fourth forward speed is provided through the engagement of the second clutch C2 and the third clutch C3. Also in this case, as in the first to third forward gear positions, the engagement of the third clutch C3 causes the reduced rotation from the second planetary gear set GS2 to be input to the fourth sun gear S4 of the fourth planetary gear set GS4.

Concurrently, the engagement of the second clutch C2 causes the rotation of the second ring gear R2, i.e., the input rotation from the input shaft Input, to be transmitted to the third carrier PC3 (and the unitarily rotating fourth ring gear R4) as its is. Then, in the fourth planetary gear set GS4, the rotation input to the fourth ring gear R4 is combined with the rotation input to the fourth sun gear S4 and the combined rotation is then output via the fourth carrier PC4 to the output gear Output. In the fourth forward gear position, the rotation of the input shaft Input is output at slightly reduced speed to the output gear Output.

— Fifth Forward Gear Position —

In the fifth forward gear position, as shown in FIG. 2, the third clutch C3 engaged in the fourth forward gear position is released and the first clutch C1 is engaged. In other words, the fifth forward speed is provided through the engagement of the first clutch C1 and the second clutch C2. In this case, as in the fourth forward gear position, the engagement of the second clutch C2 causes the rotation of the second ring gear R2, i.e., the input rotation from the input shaft Input, to be transmitted to the third carrier PC3 as it is.

Further, as in the third forward gear position, the engagement of the first clutch C1 causes the reduced rotation from the first planetary gear set GS1 to be input to the third sun gear S3 of the third planetary gear set GS3. Then, in the third planetary gear set GS3, the rotation input to the third sun gear S3 is combined with the rotation input to the third carrier PC3 and the combined rotation is then output via the third ring gear R3 (and the unitarily rotating fourth carrier PC4) to the output gear Output. In the fifth forward gear position, the input rotation is output at slightly increased speed.

— Sixth Forward Gear Position —

In the sixth forward gear position, as shown in FIG. 2, the first clutch C1 engaged in the fifth forward gear position is released and the first brake B1 is engaged. In other words, the sixth forward speed is provided through the engagement of the second clutch C2 and the first brake B1. In this case, the engagement of the first brake B1 stops the rotation of the third sun gear S3 in the third planetary gear set GS3. Therefore, as in the fourth and fifth forward gear positions, when the rotation of the input shaft Input is transmitted to the third carrier PC3 as it is, the rotation is increased in speed and then output via the third ring gear R3 (and the fourth carrier PC4) to the output gear Output. In other words, in the sixth forward gear position, the input rotation passes through substantially only the third planetary gear set GS3, is increased therein in speed and then output.

— Reverse Gear Position —

As shown in FIG. 2, the reverse speed is provided through the engagement of the first clutch C1 and the second brake B2. In this case, as in the third and fifth forward gear positions, the input rotation consistently reduced in speed by the first planetary gear set GS1 is transmitted via the first clutch C1 to the third sun gear S3 of the third planetary gear set GS3. Further, as in the first forward gear position, the engagement of the second brake B2 stops the rotation of the third carrier PC3. Therefore, the reduced rotation transmitted to the third sun gear S3 in the above manner is reversed and output via the third ring gear R3 (and the fourth carrier PC4) to the output gear Output.

Advantages of Automatic Transmission

As described above, the automatic transmission AT of the present embodiment includes the first to fourth single pinion type simple planetary gear sets GS1 to GS4 and is configured to selectively operate the first to third clutches C1 to C3 and the first and second brakes B1 and B2 and thereby provide six forward speeds and one reverse speed. In other words, the automatic transmission AT includes no compound planetary gear sets such as a Ravigneaux planetary gear train, does not need any double sun gear type, double pinion type or double ring gear type planetary gear set, and needs only a relatively small number, not more than five, of clutches and brakes for making and breaking the connection between rotation elements. This is advantageous in compaction, cost saving, weight reduction and noise reduction.

Though described in detail in Patent Documents 2 and 3 cited in Description of the Related Art, if a so-called Simpson planetary gear train is employed for the switching between power transmission paths and power is input to it via a single consistently speed reducing planetary gear set, in order to provide an overdrive gear, it is necessary that one of two planetary gear sets forming the Simpson planetary gear train has an input/output path to both or one of the carrier and the sun gear. This, however, does not hold, if the input shaft Input and the output gear Output are disposed on the same axis, unless one of the two planetary gear sets is of double ring gear type or double sun gear type.

In contrast, the present embodiment includes an additional consistently speed reducing planetary gear set (one of the first and second planetary gear sets GS1 and GS2) and is configured to allow power to be also input to the planetary gear train (the third and fourth planetary gear sets GS3 and GS4) via the additional gear set. Therefore, even in the case where the input shaft Input and the output gear Output are disposed on the same axis, there is no need for a planetary gear set of complex structure such as a double ring gear type planetary gear set as disclosed in Patent Documents 2 and 3, which avoids the occurrence of gear noise and vibrations due to such a complex planetary gear set.

Further, even if such an additional planetary gear set is provided, it is downsized as much as possible as a consistently speed reducing gear set with small transmission torque. Therefore, the additional planetary gear set can have a compact structure as compared to double ring gear type one or double sun gear type one disclosed in Patent Documents 2 and 3. More specifically, the double ring gear type and double sun gear type planetary gear sets disclosed in the above patent documents are used not for consistently speed reducing but for the switching between torque transmission paths, which has a possibility that very large torque acts on the transmission in some of gear positions.

Therefore, the above double ring gear type or double sun gear type planetary gear set cannot be obtained by simply separating a ring gear or a sun gear into halves but must be configured so that individual gears thus separated are given sufficient strength in consideration of the action of large torque as described above. As a result, the obtained planetary gear set has a profile of substantially the same size as a combination of two planetary gear sets.

In contrast, a consistently speed reducing planetary gear set with small torque load can be substantially downsized. Therefore, even if a single consistently speed reducing planetary gear set is provided in addition to a single planetary gear set for the switching between power transmission paths, the total space occupied by both the gear sets becomes smaller than the double ring gear type or double sun gear type planetary gear set. Additionally, the two planetary gear sets can be arranged apart from each other, which increases layout flexibility and provides effective layout space utilization.

In view of the above, in the present embodiment, two small-sized consistently speed reducing planetary gear sets GS1 and GS2 are arranged oppositely on both the axial sides of the Simpson planetary gear train composed of relatively large-sized third and fourth planetary gear sets GS3 and GS4, and the first to third clutches C1 to C3 formed of, for example, wet multi-plate clutches, and the first brake B1 are arranged to surround the four planetary gear sets. This effective layout space utilization provides a compact automatic transmission AT.

According to the present embodiment, the number of planetary gear sets is increased as compared to that in Patent Documents 2 and 3. However, since the present embodiment does not employ any double ring gear type or double sun gear type planetary gear set of complex structure, it is not at a disadvantage in terms of cost but rather enables cost reduction.

Though a detailed description is not given here, the transmission AT of the present embodiment provides a sufficiently wide gear ratio ((first forward gear)/(sixth forward gear)=5.5 to 6.0) while, like the transmissions disclosed in Patent Documents 2 and 3, keeping the planetary gear ratio between the third and fourth planetary gear sets GS3 and GS4 forming a Simpson planetary gear train within a generally applicable range (for example, (the number of sun gears)/(the number of ring gears)=0.35 to 0.65, preferably 0.38 to 0.60) and satisfying the condition that gear spacing (the gear ratio difference between adjacent gear positions) should be closer in higher gear positions, which is said to be desirable. Additionally, in order to attain the above planetary gear ratio, there is no need to increase the diameters of the third and fourth ring gears R3 and R4 much. This is also advantageous in compaction of the transmission.

Further, in each of the first to sixth forward gear positions in which input rotation is transmitted as described above, the number of rotation elements directly involved in transmission of rotation is relatively small and mechanical loss due to gear meshing is also small, which provides high transmission efficiency. In particular, in the sixth forward gear position that is the highest gear position, input rotation is increased in speed by passing through only the first planetary gear set GS1 and the speed-increased rotation is output to the output gear Output. In this case, the number of rotation elements involved in rotation transmission is smallest, which provides very high transmission efficiency.

Furthermore, the number of rotations of any rotation element in all the first to sixth forward gear positions does not become excessively high, which is advantageous in durability and reliability. When transmission is shifted from one gear position to the adjacent, such as first to second gear position or second to third gear position, both the number of clutches C1 to C3 and brakes B1 and B2 engaged and the number of clutches C1 to C3 and brakes B1 and B2 released are always singular as shown in the above operation table (FIG. 2). Therefore, the automatic transmission AT of the present embodiment has high controllability.

The concrete configuration of the present invention is not limited to that of the automatic transmission AT of the above embodiment but the present invention includes various other configurations. For example, though in the above embodiment the consistently speed reducing first and second planetary gear sets GS1 and GS2 are arranged at both ends of the transmission case, respectively, the present invention is not limited to this configuration.

Further, though the above embodiment describes an example in which the automatic transmission AT of the present invention is applied to a transversely mounted power train for a front engine-front drive car (FF car), the present invention is applicable to a transversely mounted power train for a rear engine-rear drive car (RR car). Furthermore, though the above embodiment describes an example in which the engine and the torque converter are disposed on the left side as viewed in FIG. 1, they can be disposed on the right side as viewed in FIG. 1.

What is claimed is:

1. An automatic transmission in which an input shaft and an output part are disposed on the same axis, first to fourth planetary gear sets each formed of a sun gear, a carrier and a ring gear are provided and first to third clutches and first and second brakes are selectively operated to switch between power transmission paths from the input shaft to the output part, thereby providing at least six forward speeds, wherein
each of the first and second planetary gear sets includes a given rotation element connected to the input shaft to consistently reduce the speed of input rotation and output the speed-reduced rotation,
the third and fourth planetary gear sets are single pinion planetary gear sets and are connected to each other to have four rotation elements in combination, one of the four rotation elements being connected to the output part, and
the first and second planetary gear sets are arranged oppositely in the axial direction of the third and fourth planetary gear sets with the third and fourth planetary gear sets interposed therebetween.

2. The automatic transmission of claim 1, wherein the first and second planetary gear sets are single pinion planetary gear sets and the sun gears of the first and second planetary gear sets are fixed to a transmission case.

3. The automatic transmission of claim 2, wherein the sun gears of the first and second planetary gear sets are fixed to bosses, respectively, formed at both axial ends of the transmission case.

4. The automatic transmission of claim 1, wherein the first and second planetary gear sets have different rotational speed reduction ratios.

5. The automatic transmission of claim 1, wherein
the first planetary gear set is a single pinion planetary gear set including a first sun gear, a first carrier and a first ring gear,
the second planetary gear set is a single pinion planetary gear set including a second sun gear, a second carrier and a second ring gear,
the first and second sun gears are constantly secured to a transmission case and the first and second ring gears are constantly connected to the input shaft,
the third planetary gear set is a single pinion planetary gear set including a third sun gear, a third carrier and a third ring gear,
the fourth planetary gear set is a single pinion planetary gear set including a fourth sun gear, a fourth carrier and a fourth ring gear,
the third ring gear, the fourth carrier and the output part are constantly connected and the third carrier and the fourth ring gear are constantly connected,
the automatic transmission includes:
a first clutch for making and breaking connection between the first carrier and the third sun gear;
a first brake for making and breaking connection between the third sun gear and the transmission case;
a second brake for making and breaking connection between the third carrier and the transmission case;
a second clutch for making and breaking connection between the third carrier and the second ring gear; and
a third clutch for making and breaking connection between the fourth sun gear and the second carrier, and
the automatic transmission is configured to provide a first speed through engagement of the third clutch and the second brake, a second speed through engagement of the third clutch and the first brake, a third speed through engagement of the first clutch and the third clutch, a fourth speed through engagement of the third clutch and the second clutch, a fifth speed through engagement of the first clutch and the second clutch and a sixth speed through engagement of the second clutch and the first brake.

6. The automatic transmission of claim 5, wherein the first and second sun gears are fixed to bosses, respectively, formed at both axial ends of the transmission case.

7. The automatic transmission of claim 5, wherein the first and second planetary gear sets have different rotational speed reduction ratios.

* * * * *